US011794342B2

(12) United States Patent
Hill et al.

(10) Patent No.: US 11,794,342 B2
(45) Date of Patent: Oct. 24, 2023

(54) ROBOT PLANNING USING UNMANNED AERIAL VEHICLES

(71) Applicant: Intrinsic Innovation LLC, Mountain View, CA (US)

(72) Inventors: Michael Barrett Hill, San Jose, CA (US); Adam Nicholas Ruxton, Sunnyvale, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 448 days.

(21) Appl. No.: 16/932,481

(22) Filed: Jul. 17, 2020

(65) Prior Publication Data

US 2022/0016772 A1 Jan. 20, 2022

(51) Int. Cl.
*B25J 9/16* (2006.01)
*B64C 39/02* (2023.01)
(Continued)

(52) U.S. Cl.
CPC ........... *B25J 9/1664* (2013.01); *B25J 11/005* (2013.01); *B25J 19/02* (2013.01); *B64C 39/024* (2013.01);
(Continued)

(58) Field of Classification Search
CPC ..................................................... B25J 9/1664
See application file for complete search history.

(56) References Cited

U.S. PATENT DOCUMENTS 10,607,406 B2   3/2020  Sen et al.
10,633,093 B2   4/2020  Castillo-Effen et al.
(Continued)

FOREIGN PATENT DOCUMENTS

EP   3900513 A1 * 10/2021 ........... A01B 79/005
KR   101947057      2/2019
(Continued)

OTHER PUBLICATIONS

Olivares, Victor et al., Modeling Internal Logistics by Using Drones on the Stage of Assembly of Products, (https://pdf.sciencedirectassets.com/280203) Procedia Computer Science 55 (2015) 1240-1249 (hereinafter "Olivares") (Year: 2019).*
(Continued)

*Primary Examiner* — Jean Paul Cass
(74) *Attorney, Agent, or Firm* — Fish & Richardson P.C.

(57) ABSTRACT

Methods, systems, and apparatus, including computer programs encoded on computer storage media, for robot motion planning using unmanned aerial vehicles (UAVs). One of the methods includes determining that a current plan for performing a particular task with a robot requires modification; in response, generating one or more flight plans for an unmanned aerial vehicle (UAV) based on a robotic operating environment comprising the robot; obtaining, using the UAV in accordance with the one or more flight plans, a new measurement of the robotic operating environment comprising the robot; and generating, based at least on a difference between the new measurement of the robotic operating environment and a previous measurement of the robotic operating environment, a modified plan for performing the particular task with the robot.

20 Claims, 5 Drawing Sheets

(51) Int. Cl.
  *G08G 5/00* (2006.01)
  *B25J 11/00* (2006.01)
  *B25J 19/02* (2006.01)
  *B64U 101/30* (2023.01)

(52) U.S. Cl.
  CPC ......... *G08G 5/0034* (2013.01); *G08G 5/0039* (2013.01); *B64U 2101/30* (2023.01); *B64U 2201/10* (2023.01)

(56) References Cited

U.S. PATENT DOCUMENTS

| | | | | |
|---|---|---|---|---|
| 2010/0268409 | A1* | 10/2010 | Vian | G05D 1/104 701/25 |
| 2017/0100837 | A1* | 4/2017 | Zevenbergen | B25J 9/1674 |
| 2018/0021956 | A1* | 1/2018 | Atherton | G06V 40/23 700/259 |
| 2020/0180791 | A1* | 6/2020 | Kimberly | B64C 39/024 |

FOREIGN PATENT DOCUMENTS

| | | | | |
|---|---|---|---|---|
| WO | WO-2004067232 | A2 * | 8/2004 | .............. B25J 9/163 |
| WO | WO-2020021191 | A1 * | 1/2020 | ........... B64C 39/024 |

OTHER PUBLICATIONS

Lei et al, Airborne Vision Based Navigation for A UAV Accuracy Landing Using Infrared Lamps, J Intell Robot Syst (2013) (Mar. 15, 2013) Springer Science Business Media (https://link.springer.com/content/pdf/10.1007/s10846-013-9819-5.pdf) (Year: 2013).*

Barbosa, GF, A Conceptual Study Towards Delivery of Consumable Materials to Aircraft Assembly Stations Performed by Mobile Robots Based on Industry 4.0 Principles (Jan. 2017) Journal of Aeronautics & Aerospace Engineering 06(02) (DOI:10.4172/2168-9792.1000187) (Jan. 2017) (hereinafter "Barbosa"). (Year: 2017).*

* cited by examiner

ROBOT PLANNING USING UNMANNED AERIAL VEHICLES

BACKGROUND

This specification relates to robotics, and more particularly to planning robotic movements.

Robotics planning refers to scheduling the physical movements of robots in order to perform tasks. For example, an industrial robot that builds cars can be programmed to first pick up a car part and then weld the car part onto the frame of the car. Each of these actions can themselves include dozens or hundreds of individual movements by robot motors and actuators.

Robotics planning has traditionally required immense amounts of manual programming in order to meticulously dictate how the robotic components should move in order to accomplish a particular task. Manual programming is tedious, time-consuming, and error prone. In addition, a plan that is manually generated for one workcell can generally not be used for other workcells. In this specification, a workcell is the physical environment in which a robot will operate. Workcells, the robots themselves, or both have particular physical properties, e.g., physical dimensions or end-of-arm tool geometries, that impose constraints on how robots can move within the workcell. Thus, a manually programmed plan for one workcell may be incompatible with other environments having different robots, a different number of robots, a different end-of-arm tool, or different physical workcell dimensions.

Unmanned aerial vehicles (UAVs) comprise a variety of vehicles, from conventional fixed wing airplanes, to quadcopters, to ornithopters (i.e., machines that fly like birds), and are used in a variety of roles. When an UAV operates in a remote-control mode, a pilot or driver that is at a remote location can control the UAV via commands that are sent to the UAV via a wireless network. When the UAV operates in autonomous mode, the UAV typically moves based on pre-programmed navigation waypoints, dynamic automation systems, or a combination of these. Further, some UAVs can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

UAVs may be equipped with sensors to capture observations during flight, which may be used for navigation, localization, or other purposes. Example sensors include camera, gyroscope, inertial measurement unit (IMU), and lidar sensor, among others.

SUMMARY

This specification generally describes how a system can generate motion plans for one or more robots in a workcell based on observations captured by using one or more on-board sensors of an unmanned aerial vehicle (UAV). For example, the system can generate the motion plans from initial plans generated offline or plans that are currently in execution by the robots. The plan can include the robot maneuvering through an area of a workcell. The plan can include moving the robot from a starting point to an end point to perform a task.

In some examples, during online operation, the system may determine that the current plan in execution by a workcell requires modification. For example, the current plan may include a robot performing a particular task using an end-of-arm tool. During operation, the system may determine, e.g., from measurements captured by a sensor of the workcell, that the robot is no longer able to attain at least a threshold level of performance on the particular task with a current tool which has likely undergone some degree of deformation or damage, including wear or tear. In response, the system notifies another robotic system or a human operator so as to get the current tool replaced. The system then modifies the current plan to account for any differences between the current tool and a replacement tool, i.e., as characterized by the measurements of the tools captured by on-board sensor of an UAV, and thereby controls the robot to continue performing the particular task by following a modified plan that is highly tailored for the replacement tool.

In some examples, the system can receive a generic plan that is generated offline and adapt the generic plan for each of a plurality of workcells. The workcells may have different layouts. The robots within different workcells may perform different tasks. To generate a modified plan for each workcell, the system can determine adjustment to the generic plan based on measurements of the workcell captured by on-board sensors of a UAV, and thereby control the robot to perform a particular task while conforming to workcell-specific constraints.

Particular embodiments of the subject matter described in this specification can be implemented so as to realize one or more of the following advantages.

A system described in this specification can automatically and rapidly generate respective plans that are highly tailored for an arbitrary number of workcells. In particular, the system generates such plans based on observations captured by on-board sensors of UAVs. By navigating the UAVs to make observations of a workcell using on-board sensors, e.g., in place of manually measuring the workcell using hand-held scanners, the techniques described in this specification can dramatically reduce the amount of time and cost that is conventionally required in order to obtain measurements of a latest state of the workcell. Certain techniques described in this specification further allow for the system to automatically generate an optimal plan for a UAV to capture certain desired observations of a workcell from which high quality measurements of the workcell can be determined. Such measurements of the workcell can then be used for real-time robot motion planning or replanning, which can make those processes faster and less manual. In this way, the process can render routine tasks including, for example, workcell calibration, recalibration, retooling, maintenance, and other ongoing analyses more effective, efficient, or both.

This process can minimize the overall chances for downtime due to robot failure that would otherwise upsurge as the number of workcells grows. Specifically, by systematically scanning workcell states at fixed intervals, including hardware, equipment and robots, this process can effectively capture any changes to, or divergences from the original workcell plans, and thereby facilitates predictive maintenance of the workcells, e.g., by predicting when certain motors would fail, or an end of arm tool becomes worn to the point of failure.

The system can be integrated into and collaborate with existing workcell management systems of the facility that houses the workcells. For example, another information management system, e.g., a programmable logic controller (PLC) or a manufacturing execution system (MES), can leverage this system as an additional service for data capture and cataloguing.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In this specification, a robot is a machine having a base position, one or more movable components, and a kinematic model that can be used to map desired positions, poses, or both in one coordinate system, e.g., Cartesian coordinates, into commands for physically moving the one or more movable components to the desired positions or poses.

In this specification, an end-of-arm tool (or for brevity, may also be referred to as a "tool") is a device that is part of and is attached at the end of the kinematic chain of the one or more moveable components of the robot. The robot can use the tool to interact with external parts or objects. Example tools include grippers, welding devices, and sanding devices.

In this specification, a task is an operation to be performed by a tool. For brevity, when a robot has only one tool, a task can be described as an operation to be performed by the robot as a whole. Example tasks include welding, glue dispensing, part positioning, and surfacing sanding, to name just a few examples. Tasks are generally associated with a type that indicates the tool required to perform the task, as well as a position within a workcell at which the task will be performed.

In this specification, a motion plan (or for brevity, may also be referred to "plan") is a data structure that provides information for executing an action, which can be a task, a cluster of tasks, or a transition. In this specification, a transition is a motion plan that describes a movement to be performed between a start point and an end point. The start point and end point can be represented by poses, locations in a coordinate system, or tasks to be performed. Motion plans can be fully constrained, meaning that all values for all controllable degrees of freedom for the robot are represented explicitly or implicitly; or underconstrained, meaning that some values for controllable degrees of freedom are unspecified.

Figure 1:
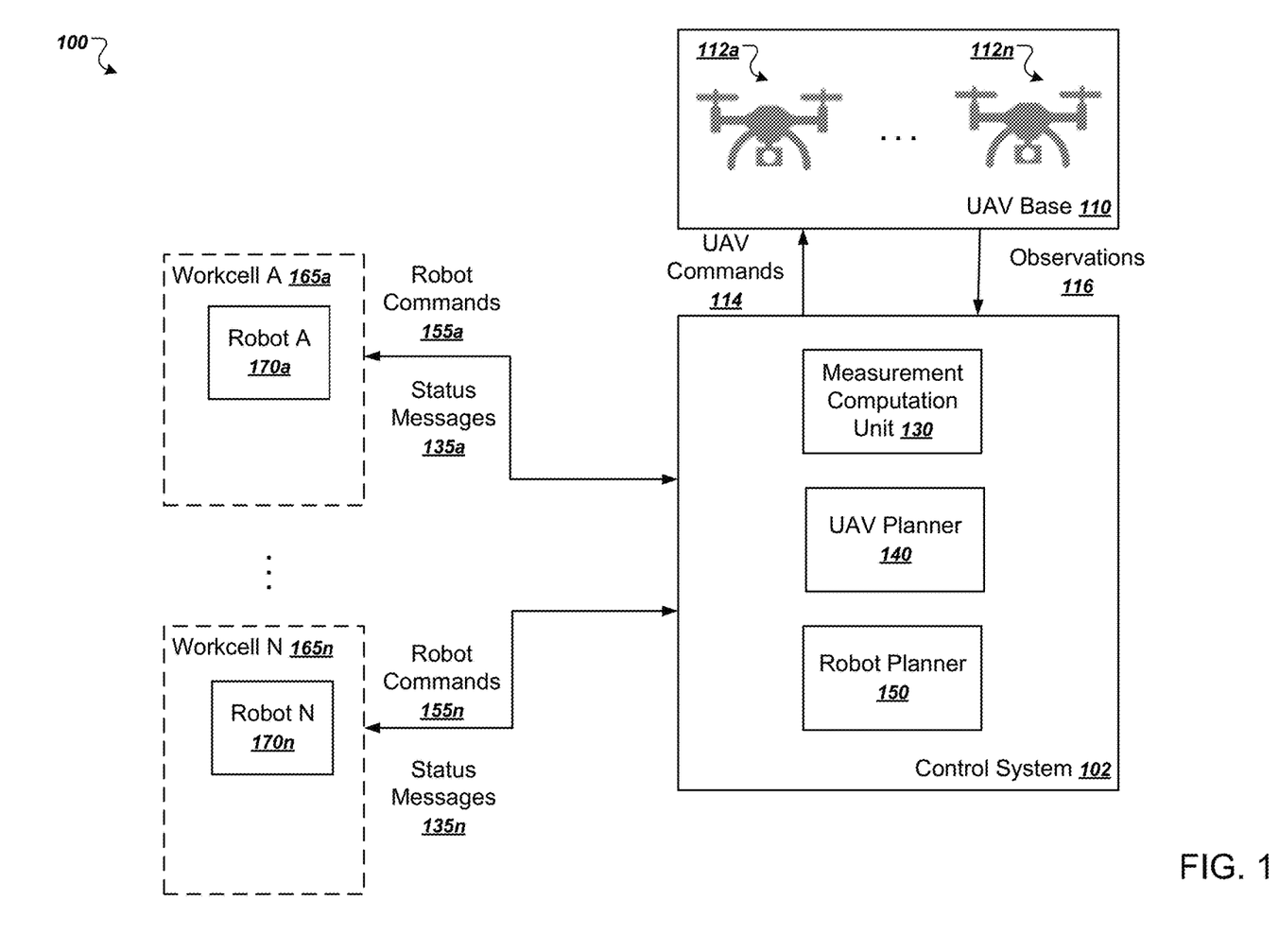
FIG. 1 is a diagram that illustrates an example system.

FIG. 1 is a diagram of an example system 100. The system 100 is an example of a system that can implement the techniques described in this specification.

The system 100 includes a number of functional components, including a control system 102 which in turn includes a measurement computation unit 130, an UAV planner 140, and a robot planner 150. Each of these components can be implemented as computer programs installed on one or more computers in one or more locations that are coupled to each other through any appropriate communications network, e.g., an intranet or the Internet, or combination of networks.

In general, the control system 102 provides commands 155a-n to be executed by one or more robots 170a-n included in one or more workcells 165a-n.

In order to compute the commands, the control system 102 can consume status messages 135a-n generated by the workcells. For example, the status messages can include online observations made by one or more sensors making observations within the workcells. As another example, the status messages can specify make/model/configuration/health of the tools that are available for use by the robots within the workcells. As another example, the status messages can include robot runtime statistics or feedbacks. As illustrated in FIG. 1, each workcell (e.g., workcell A) includes a respective robot (e.g., robot A). However, the workcells need not have a one-to-one correspondence with robots and there may be a different number of workcells, or a different number of robots.

As the number of workcells grows, the chance of downtime due to failures rises, and in any real implementation, it's close to 1.0. As such, the motion plans of different workcells will oftentimes need to be updated in a timely manner to ensure productivity, safety, or both.

The control system 102 can use the robot planner 150 to generate robot motion plans for the workcells 165a-n. In some implementations, the robot planner 150 is an offline planner. That is, the control system 102 can use the robot planner 150 to generate initial plans before the workcells 165a-n execute any operations, and the robot planner 150 does not receive any direct feedback from the workcells 165a-n. In some such implementations, the robot planner 150 can be hosted offsite at a data center separate from the control system 102.

In some other implementations, the robot planner 150 can be an online planner that is local to the facility that houses the workcells 165a-n. That is, the control system 102 can execute the plans generated by the robot planner 150 by issuing robot commands 155a-n to the workcells 160a-n in order to drive the movements of the robots 170a-n, and provide feedback on the execution to the robot planner 120. The robot planner 150 can then respond to feedback from the control system 102, and generate new modified plans in response to the feedback.

The robot planner 150 receives a current robot motion plan. For example, the current plan is a plan generated by the robot planner 150 at a previous time point. As another example, the current plan is a plan that is generated offline, e.g., by a human user or another robot planner.

The robot planner 150 can generate, from the current plan, a modified plan for each workcell that accounts for any changes that have taken place in the workcell since the current plan was generated. In other words, the modified plan is a plan that has been adapted for a latest state of the workcell.

To generate the modified plan for a workcell, the control system 102 also provides the robot planner 150 with data that characterizes the latest state of the workcell (i.e., the state of the workcell at a current time point). Typically, the data includes sensor observation, information derived from the sensor observation, or both. Conventionally, to obtain such data, a human operator would have to (i) safely shut down the workcell for maintenance entry, (ii) measure or scan the workcell using hand-held scanners, and (iii) input the measurement into the system for use in computing the modified plan. Preferably, the robot pose is moved at least once during the manual measurement step so as to allow for the human operator to obtain a well-rounded measurement of the workcell. A major limitation of this process lies in the time-consuming nature of manual measurement. Generating modified plans for multiple, e.g., tens or hundreds of, different workcells in parallel under this process can be further problematic, because this amount of data is expensive and cumbersome to obtain and curate manually, and there are many scenarios where workcell measurements are unsafe or impractical to be obtained by human operators.

Therefore, to improve the effectiveness and efficiency in data collection, the system 100 makes use of one or more unmanned aerial vehicles (UAVs), e.g., UAVs 112a-n, that are each capable of capturing observations of the workcells by using one or more on-board sensors. An unmanned aerial vehicle (UAV) refers to an aircraft without a human pilot on board and a type of unmanned vehicle. For example, UAVs can include fixed wing airplanes, multipropeller drone, ornithopters, and the like. In some cases, the one or more UAVs 112a-n are stationed at a UAV base 110 where they can recharge on-board batteries and receive hardware/software updates.

In order to do this, the control system 102 can use a UAV planner 140 to generate a plan for a UAV. The overall goal of the UAV planner 140 is to compute a plan that allows the UAV to navigate through one or more flight paths, and/or execute one or more actions, while ensuring that the UAV is able to use the on-board sensors to capture certain desired observations of the workcell. For example, the plan can specify a specific UAV flight path including a plurality of waypoints in an aerial environment surrounding the workcell. As another example, the plan can specify particular types of sensors that are required for capturing the observations. As another example, the plan can specify sensor pick up or sensor placement actions. As yet another example, the plan can specify particular time points or waypoint positions at which the sensors should capture observations of the workcell.

Generally, the UAV can make use of different on-board sensors when in flight. For example, the sensors can include devices that can provide localization or navigational assistance to the UAV, e.g., IMU, gyroscope, or accelerometer. As another example, the sensors can include devices that can take observation of a current state of the workcell, e.g., camera sensor, lidar sensor, ultrasonic sensor, radar sensor, or infrared sensor. As yet another example, the sensor can include detachable devices that can provide navigational guidance to the UAV during plan execution, e.g., a laser or light-based anchor sensor. When placed at one or more predetermined locations with a workcell, such anchor sensors typically allow for the UAV to accurately determine its actual position with respect to the workcell, e.g., through triangulation positioning techniques, thereby ensuring that desired observations of the workcell can be captured.

In particular, the control system 102 may, but need not, run the UAV planner 140 to generate a new plan for a UAV every time a new workcell measurement is required. For example, the control system 102 can store some or all of the previously generated plans at a memory accessible to the system so that these plans can be re-used for controlling the UAVs to make observations in the future. This improves efficiency in generating the modified plan for the workcell.

The control system 102 issues UAV commands 114 to the UAVs 112a-n, which drive the UAVs to execute the plans to capture different observations 116 of the workcells by using the on-board sensors. Specifically, the control system 102 can issue commands to the motors or actuators of the UAV. The control system 102 can also issue commands to the on-board sensors of the UAV. When in flight, the UAVs return the observations 116 captured by the on-board sensors to the control system 102 either in real-time or at predetermined intervals, e.g., through a data communication network.

The control system 102 can use a measurement computation unit 130 to determine the new measurement of the workcell. In general, the measurement computation unit 130 implements software that is configured to compute measurements of the workcell from the observations 116, information derived from observations 116, or both, for example, by using perception techniques. For example, the measurement can specify position and orientation of a tool attached to a robot arm, e.g., with reference to the robot or another physical object in the workcell. As another example, the measurement can specify geometric information of the tool. As another example, the measurement can specify positions of obstacles in the workcell. As yet another example, the measurement can specify a parameterized layout of the entire workcell.

The control system 102 can also use the robot planner 150 to generate a plan for the robot to assume one or more measuring poses, e.g., either before or during the UAV measurement process. The measuring pose generally refers to a robot pose which can maximize the observable area of the workcell with respect to the sensors of the UAVs.

The control system 102 then uses the robot planner 150 to generate, based on the new measurement and the current plan, the modified plan and thereafter issues new robot commands 155a-n to cause the robots to execute the modified plan. In particular, the modified plan accounts for any differences between (i) the new measurement of the workcell and (ii) a previous measurement of the workcell based on which the current plan was generated. When executed by the robots in the workcell, the modified plan can generally enable the one or more robots in the workcell to perform one or more tasks with at least a threshold level of performance, e.g., in terms of accuracy, precision, efficiency, or some other appropriate performance measure.

Figure 2:
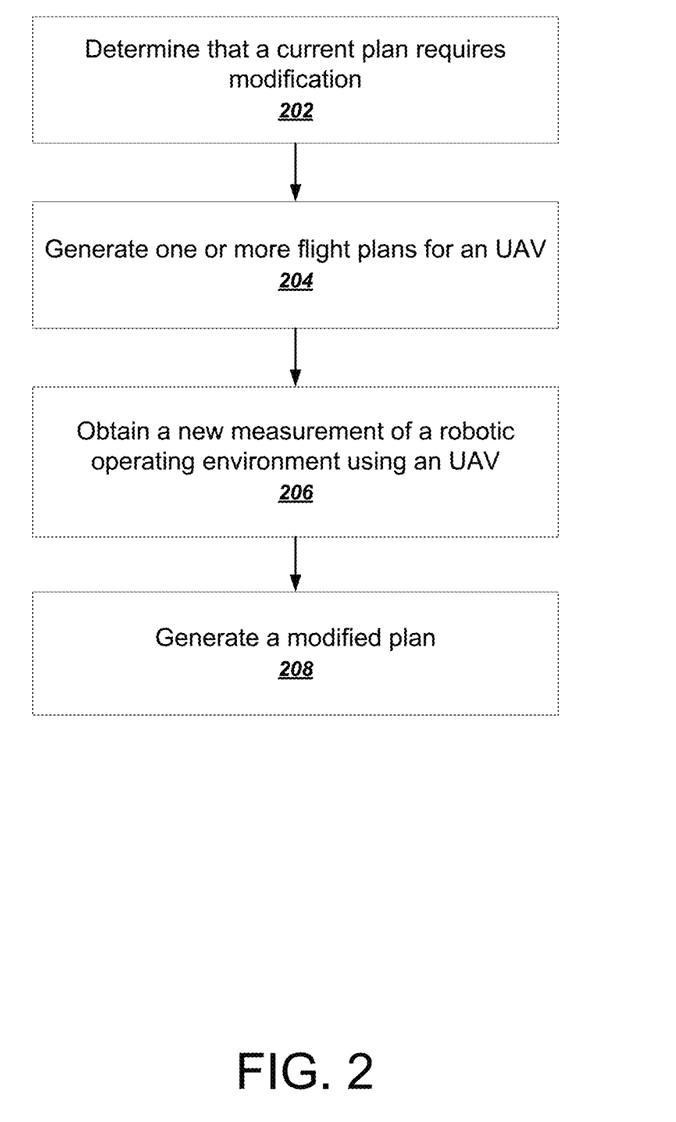
FIG. 2 a flowchart of an example process for generating a modified plan for a task to be performed by a robot.

FIG. 2 a flowchart of an example process 200 for generating a modified plan for a task to be performed by a robot. For convenience, the process 200 will be described as being performed by a system of one or more computers located in one or more locations. For example, a system, e.g., the system 100 of FIG. 1, appropriately programmed in accordance with this specification, can perform the process 200.

In general, the process 200 can be repeated for each of the plurality of workcells. For each workcell, the process 200 can also be repeated as often as necessary to generate high-quality plans based on the most recent state of the workcell.

The system determines that a current plan for performing a particular task with a robot requires modification (202). As described above, the current plan can be a plan generated by the system a previous time point or a plan generated offline, e.g., by a human user or another system.

There are many ways that the system can determine whether the current plan requires modification. For example, the system can determine that a predetermined period of time, e.g., one day, one week, or one month, has elapsed since the current plan was generated. As another example, the system can determine that a workcell maintenance (e.g., either scheduled or unscheduled) has been conducted. As another example, the system can determine that a known modification has taken place within the workcell, e.g., a change in workcell layout, an addition of a new robot to the workcell, or a tool replacement for a robot. As yet another example, of course, the system can know that the current plan requires modification upon receiving an instruction from an operator of the system.

In response, the system generates one or more flight plans for an unmanned aerial vehicle (UAV) (204). Alternatively, the system can obtain the one or more previously generated UAV flight plans from a memory accessible to the system. As described above, each flight plan can cause the UAV to navigate through one or more flight paths, and/or execute one or more actions, while ensuring that the UAV is able to use the on-board sensors to capture certain desired observations of the workcell.

The system obtains a new measurement of a workcell including the robot (206) by using the unmanned aerial vehicle (UAV) in accordance with the one or more flight plans. Briefly, the system can do this by navigating the UAV through the aerial environment surrounding the workcell while capturing different observations of the workcell using one or more on-board sensors, and subsequently determining the new measurement of the workcell from the different observations.

In some implementations, the system navigates the UAV through a flight path and thereafter computes the new measurement of the workcell from the observations captured by one or more sensors while traversing the flight path.

In some implementations, the system navigates the UAV through multiple different flight paths and thereafter computes the new measurement from respective observations captured by the one or more sensors while traversing the multiple different flight paths. This is ideal under situations where observations captured by the UAV while traversing a single flight path are not sufficient for accurately computing the new measurement, e.g., due to occlusion or obscuration of particular regions of the workcell from the field of view of the sensors of the UAV.

In some such implementations, the system moves the robot from a current pose to a new pose so as to allow the sensors to capture observations of particular regions of the workcell that are not observable by the sensors due to occlusion by the robot in the current pose.

In some such implementations, the system controls the UAV to place one or more anchor sensors at one or more predetermined locations within the workcell. The anchor sensor can provide navigational guidance to the UAV while the UAV is traversing the flight path and thereby allow for the UAV to precisely capture observations at certain waypoints along the flight path.

In some such implementations, the system controls the UAV pick up and/or engage a new sensor that is not currently on-board the UAV and thereafter controls the UAV to capture observations of the workcell using the new sensor.

A particular example of obtaining the new measurement of a robot tool by navigating the UAV through two different flight paths will be described in more detail below with reference to FIGS. 3-4.

The system generates a modified plan for performing the particular task with the robot (208) to account for any differences between (i) the new measurement of the workcell and (ii) a previous measurement of the workcell based on which the current plan was generated. In other words, the system modifies the current plan according to any changes that have taken place in the workcell since the current plan was generated. As a particular example, if the change in the workcell involves a robot tool replacement, the system can generate the modified plan based on adjusting the current plan to account for a difference between the new measurement of the new tool and the previous measurement of an old tool with which the robot executes the current plan. The measurement can include, for example, position, orientation, or geometry of the new tool.

For the very first new measurement, because there is no preceding measurement, the system can instead use a placeholder measurement that is determined, for example, from workcell configuration file or some other information sources. The system then generates the modified plan based at least on a difference between the new measurement and the placeholder measurement.

Figure 3:
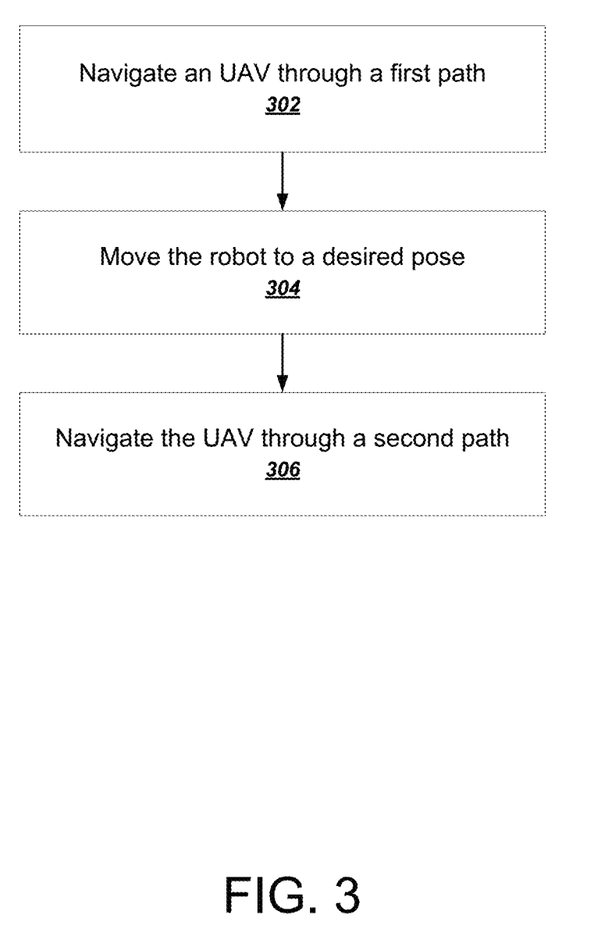
FIG. 3 is a flowchart of an example process for obtaining a new measurement by navigating an UAV through two different flight paths.

FIG. 3 is a flowchart of an example process 300 for obtaining a new measurement by navigating an UAV through two different flight paths. For convenience, the process 300 will be described as being performed by a system of one or more computers located in one or more locations. For example, a system, e.g., the system 100 of FIG. 1, appropriately programmed in accordance with this specification, can perform the process 300.

Figure 4A:
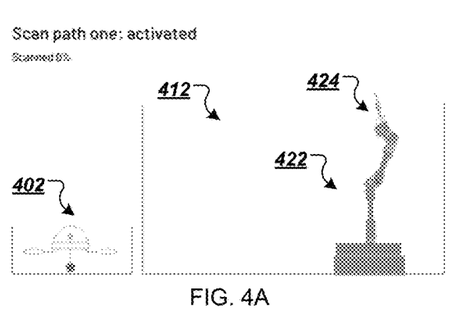
FIGS. 4A-H illustrate examples of obtaining a new measurement by navigating an UAV through two different flight paths.
Figure 4B:
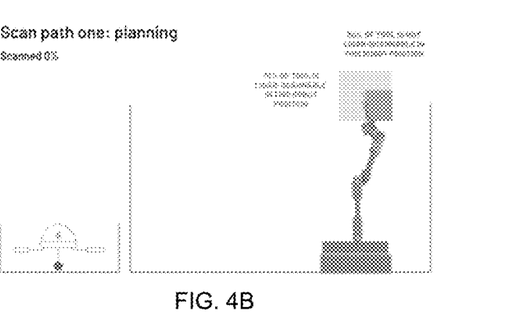

FIGS. 4A-H illustrate examples of obtaining a new measurement by navigating an UAV through two different flight paths. Specifically, as illustrated in FIG. 4A, the system activates an UAV 402 to obtain the first measurement of a tool 424 attached to a robot 422 within a workcell 412. As illustrated in FIG. 4B, the system determines that only some portion of the tool (e.g., 70% of the tool, e.g., in terms of predetermined measurement requirement) is observable by one or more lidar sensors with a current robot pose. That is, the system determines that a portion of the tool (e.g., 30% of the tool) is at least partially occluded from the lidar sensors with the current robot pose. Accordingly, the system determines a UAV plan which specifies capturing observations of the workcell by navigating the UAV through two different flight paths.

Figure 4C:
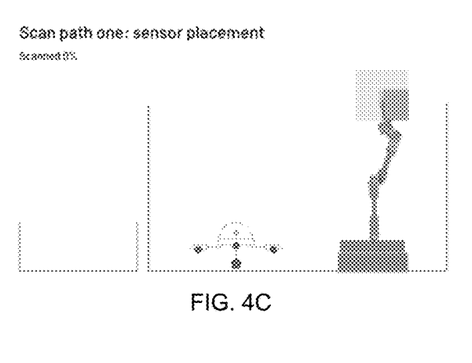
Figure 4D:
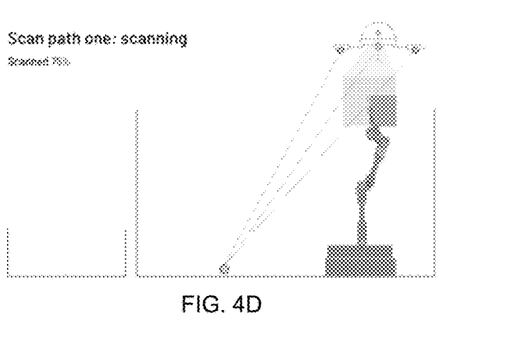

The system navigates the UAV through a first path (302) that specifies, as illustrated in FIG. 4C, (i) placing one or more anchor sensors at one or more predetermined locations within the workcell, and, as illustrated in FIG. 4D, (ii) obtaining one or more first observations of the robot tool using one or more sensors on-board the UAV.

Figure 4E:
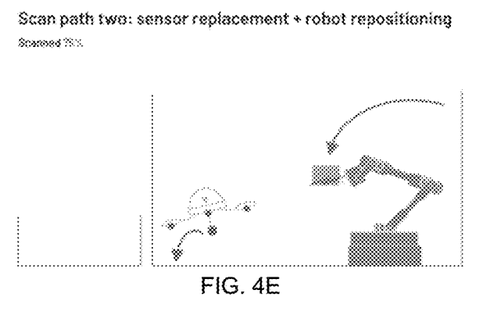

After the UAV has completed the first flight path, the system moves the robot to a desired pose (304) so as to allow the UAV to capture observations of regions of the workcell that are occluded by the robot with its current pose. As illustrated in FIG. 4E, the system moves the robot to a different pose to expose a previously occluded portion of the tool to the on-board lidar sensors of the UAV. Prior to initializing the UAV for a second path, optionally, the system can control the UAV to relocate the anchor sensors to different locations within the workcell. Further optionally, the system can control the UAV to switch the one or more on-board sensors with different sensors.

Figure 4F:
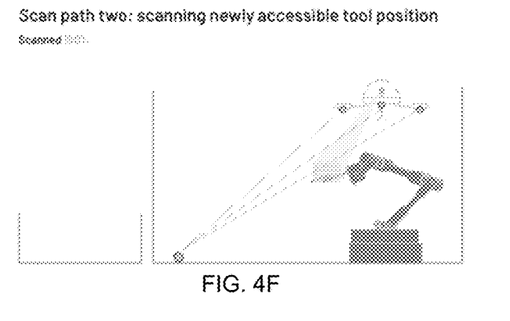

The system navigates the UAV through a second path (306). As illustrated in FIG. 4F, the second path specifies obtaining one or more second observations of the robot tool using one or more sensors on-board the UAV.

Figure 4G:
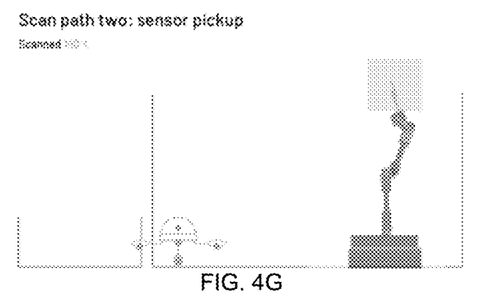
Figure 4H:
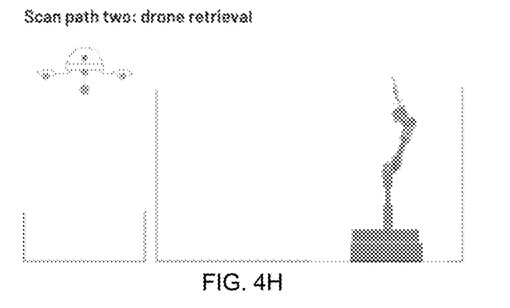

After the UAV has completed the second path, as illustrated in FIG. 4G-H, the system controls the UAV to retrieve the anchor sensors and navigates the UAV back to a base where it is stationed. The system also determines the new measurement of the robot tool from the observations captured by the UAV while traversing the two flight paths.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
  determining that a current plan for performing a particular task with a robot requires modification;
  in response, generating one or more flight plans for an unmanned aerial vehicle (UAV) based on a robotic operating environment comprising the robot;
  obtaining, using the UAV in accordance with the one or more flight plans, a new measurement of the robotic operating environment comprising the robot; and
  generating, based at least on a difference between the new measurement of the robotic operating environment and a previous measurement of the robotic operating environment, a modified plan for performing the particular task with the robot.

Embodiment 2 is the method of embodiment 1, wherein generating one or more paths flight plans for the UAV comprises:
  generating a flight plan that causes the UAV to navigate through a first path that specifies (i) placing one or more first sensors at one or more predetermined locations within the robotic operating environment and (ii) obtaining one or more first observations of the robotic operating environment using one or more second sensors aboard the UAV.

Embodiment 3 is the method of embodiment 2, further comprising:
  generating a second flight plan that causes the UAV to navigate through a second path and to obtain one or more second observations of the robotic operating environment using one or more third sensors aboard the UAV.

Embodiment 4 is the method of any one of embodiments 1-3, wherein obtaining the new measurement of the robotic operating environment further comprises:
  generating a subplan that causes the robot to move to a desired pose; and
  causing the robot execute the subplan to move to the desired pose after obtaining the one or more first observations.

Embodiment 5 is the method of any one of embodiments 1-3, wherein the second observation comprises observation of an area in the robotic operating environment that is at least partially occluded in the first observation.

Embodiment 6 is the method of any one of embodiments 1-5, further comprising:
  determining, from the first and second observations, the new measurement of the robotic operating environment.

Embodiment 7 is the method of any one of embodiments 1-6, wherein the measurement of the robotic operating environment comprises a measurement of an end-of-arm tool attached to the robot.

Embodiment 8 is the method of any one of embodiments 1-7, wherein determining that the current plan for performing the particular task with the robot requires modification comprises:
  determining that a new end-of-arm tool has been attached to the robot.

Embodiment 9 is the method of any one of embodiments 1-8, wherein generating the modified plan comprises adjusting the current plan to account for a difference between the new measurement of the new end-of-arm tool and the previous measurement of an old end-of-arm tool with which the robot executes the current plan.

Embodiment 10 is the method of any one of embodiments 1-9, wherein:
  the unmanned aerial vehicle comprises a multipropeller drone;
  the one or more first sensors comprise anchor sensors; and
  the one or more second sensors comprise one or more of camera sensor, ultrasonic sensor, or lidar sensor.

Embodiment 11 is the method of embodiment 10, wherein:
  the one or more third sensors comprise at least one sensor that is different from the second sensors.

Embodiment 12 is the method of any one of embodiments 1-11, further comprising causing the robot to execute the modified plan.

Embodiment 13 is a system comprising: one or more computers and one or more storage devices storing instructions that are operable, when executed by the one or more computers, to cause the one or more computers to perform the method of any one of embodiments 1 to 12.

Embodiment 14 is a computer storage medium encoded with a computer program, the program comprising instructions that are operable, when executed by data processing apparatus, to cause the data processing apparatus to perform the method of any one of embodiments 1 to 12.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
   determining that a current robot motion plan for performing a particular task with a robot requires modification in response to receiving an indication that a new end-of-arm tool has been attached to the robot;
   in response, generating one or more flight plans for an unmanned aerial vehicle (UAV) based on a robotic operating environment comprising the robot;
   obtaining, using the UAV in accordance with the one or more flight plans, a new measurement of the robotic operating environment comprising the robot, wherein obtaining the new measurement comprises:
      generating a robot motion subplan that causes the robot to move to a desired pose; and
      causing the robot to execute the robot motion subplan to move to the desired pose after obtaining one or more first observations by the UAV; and
   generating, based at least on a difference between (i) the new measurement of the robotic operating environment and (ii) a previous measurement of the robotic operating environment based on which the current robot motion plan is generated, a modified robot motion plan that accounts for the difference when performing the particular task with the robot.

2. The method of claim 1, wherein generating the one or more flight plans for the UAV comprises:
   generating a first flight plan that causes the UAV to navigate through a first path that specifies (i) placing one or more first sensors at one or more predetermined locations within the robotic operating environment and (ii) obtaining the one or more first observations of the robotic operating environment using one or more second sensors aboard the UAV.

3. The method of claim 2, further comprising:
   generating a second flight plan that causes the UAV to navigate through a second path and to obtain one or more second observations of the robotic operating environment using one or more third sensors aboard the UAV.

4. The method of claim 3, wherein the second observation comprises observation of an area in the robotic operating environment that is at least partially occluded in the first observation.

5. The method of claim 3, further comprising:
   determining, from the first and second observations, the new measurement of the robotic operating environment.

6. The method of claim 1, wherein the measurement of the robotic operating environment comprises a measurement of an end-of-arm tool attached to the robot.

7. The method of claim 1, wherein generating the modified robot motion plan comprises adjusting the current plan to account for the difference between the new measurement of the new end-of-arm tool and the previous measurement of an old end-of-arm tool with which the robot executes the current robot motion plan.

8. The method of claim 2, wherein:
   the unmanned aerial vehicle comprises a multipropeller drone;
   the one or more first sensors comprise anchor sensors; and
   the one or more second sensors comprise one or more of camera sensor, ultrasonic sensor, or lidar sensor.

9. The method of claim 8, wherein:
   the one or more third sensors comprise at least one sensor that is different from the second sensors.

10. The method of claim 1, further comprising causing the robot to execute the modified robot motion plan.

11. A system comprising one or more computers and one or more storage devices storing instructions that are operable, when executed by the one or more computers, to cause the one or more computers to perform operations comprising:
    determining that a current robot motion plan for performing a particular task with a robot requires modification in response to receiving an indication that a new end-of-arm tool has been attached to the robot;
    in response, generating one or more flight plans for an unmanned aerial vehicle (UAV) based on a robotic operating environment comprising the robot;
    obtaining, using the UAV in accordance with the one or more flight plans, a new measurement of the robotic operating environment comprising the robot, wherein obtaining the new measurement comprises:
       generating a robot motion subplan that causes the robot to move to a desired pose; and
       causing the robot to execute the robot motion subplan to move to the desired pose after obtaining one or more first observations by the UAV; and
    generating, based at least on a difference between (i) the new measurement of the robotic operating environment and (ii) a previous measurement of the robotic operating environment based on which the current robot motion plan is generated, a modified robot motion plan that accounts for the difference when performing the particular task with the robot.

12. The system of claim 11, wherein generating the one or more flight plans for the UAV comprises:
    generating a first flight plan that causes the UAV to navigate through a first path that specifies (i) placing one or more first sensors at one or more predetermined locations within the robotic operating environment and (ii) obtaining the one or more first observations of the robotic operating environment using one or more second sensors aboard the UAV.

13. The system of claim 12, wherein the operations further comprise:
    generating a second flight plan that causes the UAV to navigate through a second path and to obtain one or more second observations of the robotic operating environment using one or more third sensors aboard the UAV.

14. The system of claim 13, wherein the second observation comprises observation of an area in the robotic operating environment that is at least partially occluded in the first observation.

15. The system of claim 11, wherein the measurement of the robotic operating environment comprises a measurement of an end-of-arm tool attached to the robot.

16. The system of claim 11, wherein generating the modified robot motion plan comprises adjusting the current plan to account for the difference between the new measurement of the new end-of-arm tool and the previous measurement of an old end-of-arm tool with which the robot executes the current robot motion plan.

17. One or more non-transitory computer storage media encoded with computer program instructions that when executed by a plurality of computers cause the plurality of computers to perform operations comprising:
  determining that a current robot motion plan for performing a particular task with a robot requires modification in response to receiving an indication that a new end-of-arm tool has been attached to the robot;
  in response, generating one or more flight plans for an unmanned aerial vehicle (UAV) based on a robotic operating environment comprising the robot;
  obtaining, using the UAV in accordance with the one or more flight plans, a new measurement of the robotic operating environment comprising the robot, wherein obtaining the new measurement comprises:
    generating a robot motion subplan that causes the robot to move to a desired pose; and
    causing the robot to execute the robot motion subplan to move to the desired pose after obtaining one or more first observations by the UAV; and
  generating, based at least on a difference between (i) the new measurement of the robotic operating environment and (ii) a previous measurement of the robotic operating environment based on which the current robot motion plan is generated, a modified robot motion plan that accounts for the difference when performing the particular task with the robot.

18. The system of claim 12, wherein:
  the unmanned aerial vehicle comprises a multipropeller drone;
  the one or more first sensors comprise anchor sensors; and
  the one or more second sensors comprise one or more of camera sensor, ultrasonic sensor, or lidar sensor.

19. The computer storage media of claim 17, wherein generating the one or more flight plans for the UAV comprises:
  generating a first flight plan that causes the UAV to navigate through a first path that specifies (i) placing one or more first sensors at one or more predetermined locations within the robotic operating environment and (ii) obtaining the one or more first observations of the robotic operating environment using one or more second sensors aboard the UAV.

20. The computer storage media of claim 19, wherein:
  the unmanned aerial vehicle comprises a multipropeller drone;
  the one or more first sensors comprise anchor sensors; and
  the one or more second sensors comprise one or more of camera sensor, ultrasonic sensor, or lidar sensor.

* * * * *